H. BREWER.
MEASURING AND INDICATING APPARATUS.
APPLICATION FILED FEB. 21, 1919.
1,361,362.
Patented Dec. 7, 1920.
2 SHEETS—SHEET 1.
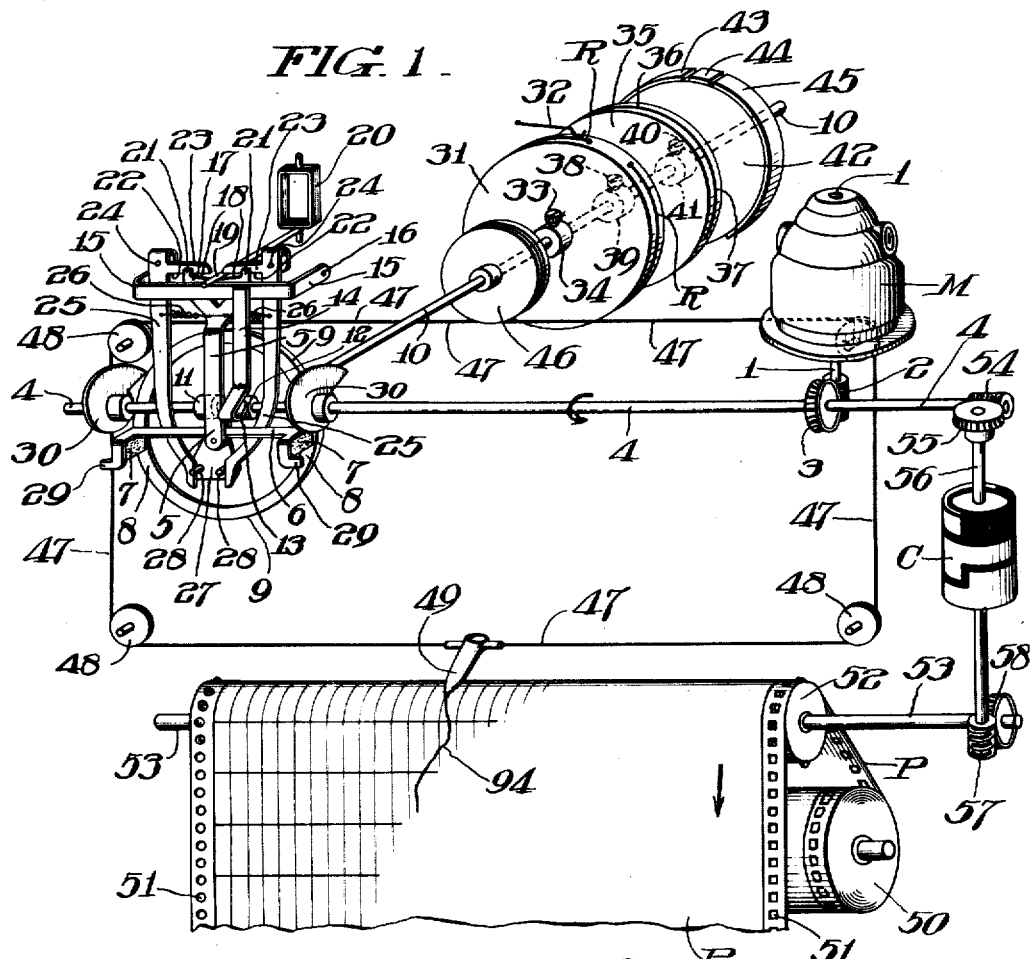
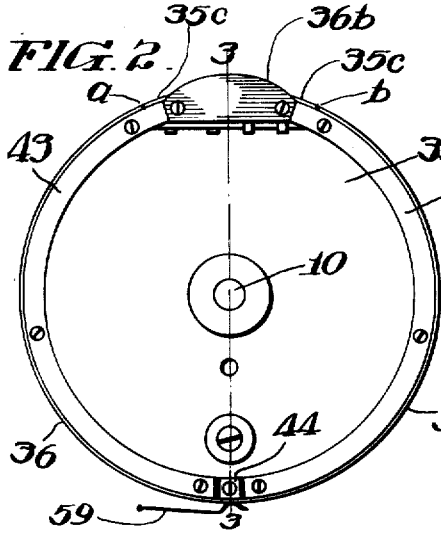
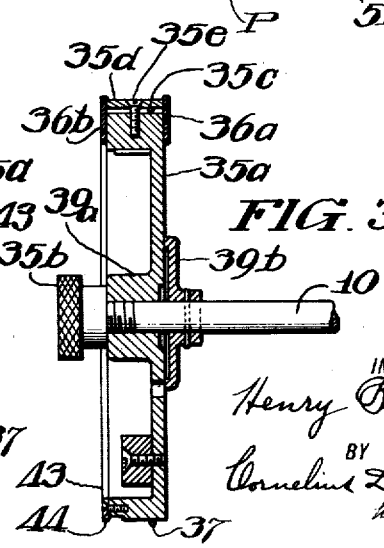
INVENTOR
Henry Brewer
BY
Cornelius D. Ehret
his ATTORNEY

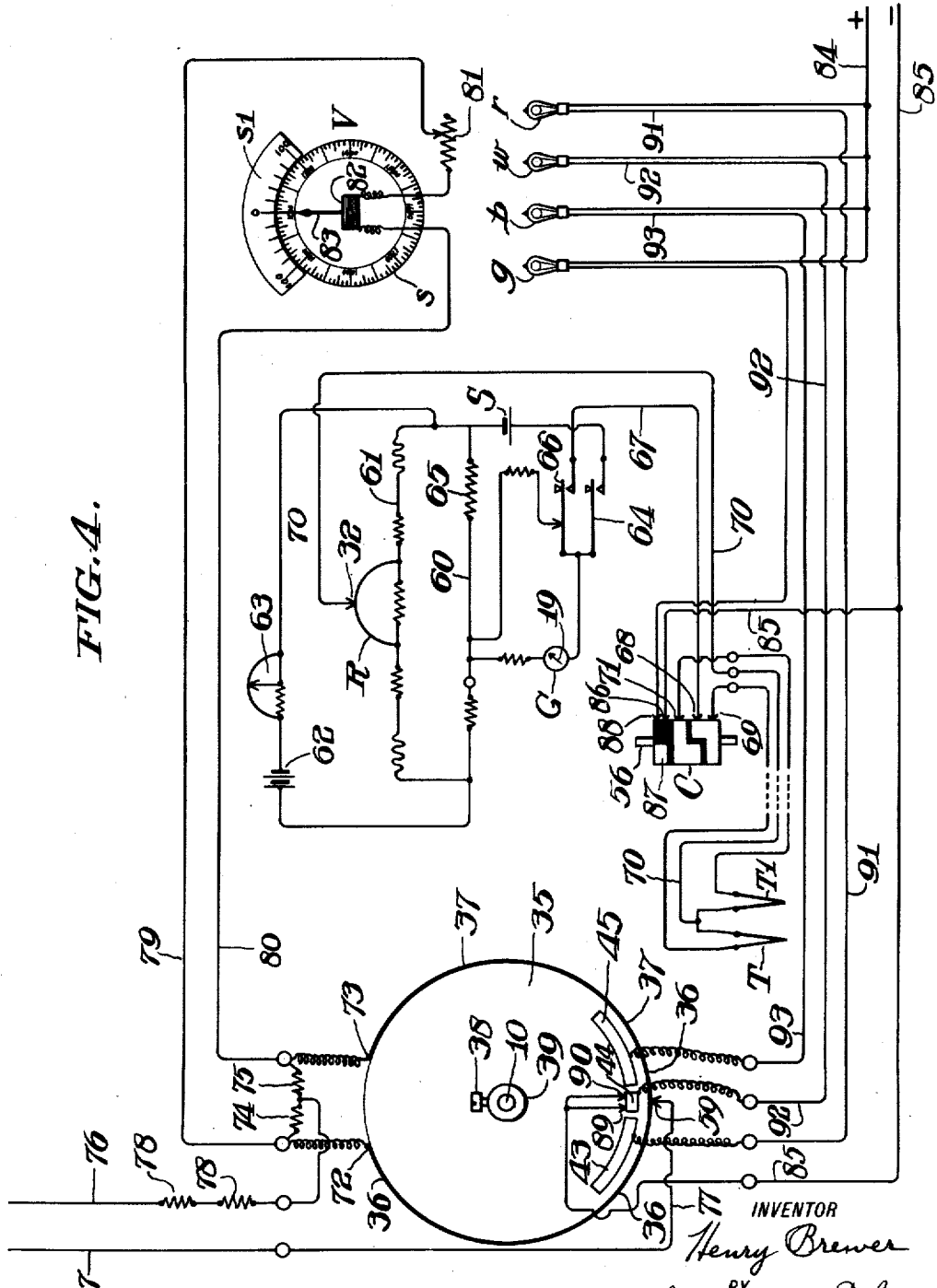

UNITED STATES PATENT OFFICE.

HENRY BREWER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

MEASURING AND INDICATING APPARATUS.

1,361,362.  Specification of Letters Patent.  Patented Dec. 7, 1920.

Application filed February 21, 1919. Serial No. 278,406.

*To all whom it may concern:*

Be it known that I, HENRY BREWER, a citizen of the United States, residing in the city and county of Philadelphia, State of Pennsylvania, have invented certain new and useful Improvements in Measuring and Indicating Apparatus, of which the following is a specification.

My invention relates to apparatus for indicating, measuring and recording conditions or variations in conditions, as chemical, physical, electrical and other conditions, and more particularly temperature and variations in temperature.

My invention resides in apparatus, which may be in the nature of recording apparatus or with which a recorder may be coöperatively associated, which controls a circuit or circuits for effecting quite accurate measurement or indication of magnitude of the condition or variation thereof, and particularly of temperature or variation thereof; and with such apparatus may be associated further indicating means, such as lamp or other signals, indicating the general magnitude of the condition, as of temperature, which obtains at a particular time.

More particularly my invention resides in apparatus of the character above referred to wherein a plurality of temperature responsive devices, as thermo-couples, resistance thermometers or the like, are subjected to the temperatures simultaneously existing and generally not widely differing in a furnace or other heating or heater device, as at different points or locations in said furnace or the like, said temperature responsive devices being brought successively or alternately into controlling relation with automatic mechanism which will produce the indications or measurements above referred to, and which may in addition produce a record of the temperature variations. It is a further feature of my invention that but a single calibrated measuring or indicating instrument, as a D'Arsonval galvanometer, suffices for both temperature responsive devices or thermo-couples.

My invention resides in further features of novelty and combination hereinafter described.

For an illustration of one of numerous forms my invention may take, reference may be had to the accompanying drawing, in which:

Figure 1 is a perspective view of structure embodying my invention.

Fig. 2 is an elevational view of a modified structure which may be employed in apparatus such as shown in Fig. 1.

Fig. 3 is a section on the line 3—3 of Fig. 2.

Fig. 4 is a diagrammatic view, illustrating parts of the structure shown in Fig. 1, together with a calibrated indicating or measuring instrument, associated signals or indicators, and associated electrical circuits.

In the illustrated example of my apparatus parts thereof and their mode of operation are similar to those disclosed in prior Letters Patent of the United States to Leeds, No. 1,125,699, January 19, 1915, my invention comprehending, but not being limited to their employment.

Referring to the drawing, M is an electric motor, or any other suitable source of power, which rotates the shaft 1, preferably at substantially constant speed, which in turn drives the worm 2 meshing with and driving the worm gear 3 secured upon the shaft 4. Pivoted near its upper end is a lever 5 back of which and pivoted upon lever 5 on a horizontal axis is the arm 6 on each end of which is a shoe 7 of cork or other suitable material frictionally engaging the rim 8 of the clutch disk or wheel 9 secured upon the shaft 10. Secured upon the shaft 4 is a cam 11 which periodically engages the lever or member 5 and moves it outwardly away from the disk 9 in opposition to a spring, not shown, thereby lifting the shoes 7 free from the rim 8 of clutch disk 9, the aforesaid spring returning the shoes 7 into engagement with the rim 8 after predetermined rotation of the cam 11. Upon the shaft 4 is secured a second cam 12 which, after the cam 11 has lifted the shoes 7 from rim 8, actuates the end of finger 13 on the lower end of the arm 14 secured at its upper end to the member 15 pivoted at 16. Upon the frame or member 15 is secured the member 17, whose upper edge 18 is inclined and increases in height from the center toward each side. Disposed immediately above the edge 18 is the needle or pointer 19 of any suitable measuring or indicating instrument, as for example, a galvanometer of which 20 is the movable coil or element which swings or deflects the needle or pointer 19 to the right or left. At opposite ends of the member 17 are the abutments 21 for limiting the deflection or swing of needle 19. Directly above the needle 19 and beneath which it normally freely swings are the edges 22, preferably straight and horizontal, upon members 23, 23 pivoted at 24, 24, and extending toward each other, leaving a gap of sufficient width between their inner ends to allow the free entry of the needle 19 when in balanced, zero or mid-position, the needle 19 normally swinging freely between the edge 18 of member 17 and the lower edges of the members 23, 23 which have the downwardly extending arms 25, 25 drawn toward each other by the spring 26. Attached to the lower end of the arm or lever 5 is the triangular plate 27 carrying the pins 28, 28 cooperating with the lower ends of members 25, 25. At opposite ends of the arm 6 are the ears or lugs 29, 29 adapted to be engaged by the cams 30, 30 similar in shape and similarly positioned and secured upon the shaft 4.

Secured upon the shaft 10 is a disk or wheel 31 of insulating material carrying upon its periphery the resistance conductor R, which may be disposed in the form of a helix laid upon the disk 31. Engaging the resistance R is the stationary contact 32 hereinafter referred to. The disk 31 may be secured to the shaft 10 in any suitable angular relation with respect to the other disks or members secured thereon, by set screw 33 threaded through the hub 34 through which the shaft 10 extends.

Secured upon the shaft 10 is a second wheel or disk 35 carrying on its periphery the resistance 36, 37, of a Wheatstone bridge hereinafter referred to. The disk 35 is held in any suitable angular position upon the shaft 10 with respect to the other disks carried thereby by the screw 38 threaded through the hub 39 through which the shaft 10 passes.

Upon the shaft 10 is similarly secured by screw 40 and hub 41 a third disk 42 carrying the arcuate contacts 43, 44 and 45, all insulated from each other and preferably from the remainder of the apparatus.

While separate disks 31, 35 and 42 are shown, it will be understood that these disks or any two of them may be one and the same unitary structure whereby the different contacts and resistances may be rotated in unison in predetermined angular relation with respect to each other by the shaft 10. It is preferable, however, that the disk 31 be independent, in which case the two disks 35 and 42 may be a unitary structure whose angular position with respect to the disk 31, and particularly with respect to the point of contact between resistance R and contact 32, may be adjusted.

In Figs. 2 and 3 such a unitary combination of disks 35 and 42 is indicated. In said figures the disk or wheel 35$^a$, shown at the end of the shaft 10, is adjustable to any angular position on the shaft 10 by clamping the nut 35$^b$ against the hub 39$^a$ of the disk 35$^a$, thrusting the same frictionally against the member 39$^b$ secured to the shaft 10. Upon the periphery of the disk 35$^a$ is shown the resistance 36, 37 which may be a wire disposed as a helix upon a mandrel and insulated therefrom, the resistance conductor itself terminating, as at $a$ and $b$, Fig. 2, while the mandrel 35$^c$ extends beyond and is clamped to the periphery of the disk 35$^a$ by the clamping piece 35$^d$ secured by screw 35$^e$. Secured to opposite faces of the disk 35$^a$ are the members 36$^a$ and 36$^b$, preferably of insulating material, on whose peripheral edges the stationary contact 59 will ride up, in case the disk 35$^a$ is rotated, during the operation of the apparatus, through substantially 180 degrees from the position indicated in Fig. 2.

On a lateral face of the disk 35$^a$ may be disposed the aforementioned arcuate contacts 43, 44 and 45.

Secured upon the shaft 10 is the grooved pulley or wheel 46 of any suitable diameter around which passes the cord 47 which passes over suitable pulleys 48 and is secured to the marker or recorder pen 49, movable transversely, on guides, not shown, with respect to the recorder paper P stored upon a roller or spool 50, and having the marginal perforations 51, engaging teeth or pins upon the periphery of the roller 52, secured upon the shaft 53 which is driven by the motor M through the worm 54, gear 55, shaft 56, worm 57 and gear 58.

Referring to Fig. 4, the resistance R is shown in a potentiometer circuit having the two branches 60 and 61, each including suitable resistances, the branches being connected in parallel with each other and in series with the battery or other source of current 62 and adjustable resistance 63. S is a standard cell, which may be employed in well known manner for procuring predetermined strength of current through the potentiometer branch 60 by adjustment of the rheostat 63, when depressing the key 64 which brings the cell S and galvanometer G into series with each other and in shunt to the potentiometer resistance 65, the needle 19 of the galvanometer G being that indicated in Fig. 1. For normal operation, however, the standard cell S is out of circuit and the switch 66 is in depressed or closed position, whereby one terminal of the galvanometer G is connected to the conductor 67, which terminates in a contact 68 bearing upon the commutator C, which may be secured upon and rotated by the shaft 56, Fig. 1. In the position indicated in Fig. 4 the contact 68 is in electrical connection through a commutator segment with the contact 69 which connects to one terminal of the temperature responsive device or thermo-couple T, whose remaining terminal connects to the conductor 70, which connects to the contact 32, which bears upon the resistance R. A second temperature responsive device or thermo-couple $T^1$ has its one terminal connected to the conductor 70 and its other terminal to the contact 71, bearing upon the commutator C, which has a contact which in a later angular position of commutator C bridges contacts 68 and 71, so bringing thermo-couple $T^1$ into communication with the galvanometer G. It will be understood that these temperature responsive devices or thermo-couples T and $T^1$ may be situated at relatively great distances from each other, as for example, in a long furnace the temperatures within which it is desired to indicate or measure; or they may be located or employed in any other suitable relation with respect to each other.

The resistances 36, 37, upon the disk 35, are indicated as one and the same resistance conductor terminating at 72 and 73 and engaged by the stationary contact 59. Inasmuch as the disk 35 is rotated to various positions, that part of the resistance 36, 37 to the right of the contact 59 is designated 37, while the remainder or part on the other side of the contact 59 is designated 36. The ends of the resistances 36 and 37 are flexibly connected to terminals of the stationary resistances 74 and 75, respectively, the four resistances constituting a Wheatstone bridge arrangement of which two of the arms are rotated by disk 35. To a point between the resistances 74 and 75 is connected a conductor 76, and to the contact 59 is connected a conductor 77, conductors 76 and 77 connecting with any suitable source of current, as a constant potential direct current electric lighting system. In the conductor 76 may be located resistances or rheostats 78, as circumstances may require. The conductors 79 and 80 connect to the junctions between resistances 36, 74 and 37, 75, and communicate through the adjustable resistance 81 with the terminals of a calibrated indicating or measuring instrument, as the D'Arsonval galvanometer V, of which only the movable coil 82 is indicated, indication of the usual permanent magnets being omitted. The movable coil 82 actuates the needle or pointer 83, which coöperates with the two scales $s$ and $s^1$, either or both of which may be present as may be desired. The scale $s$ is calibrated in any suitable units, as those of voltage, current or temperature. In the example illustrated, it is calibrated in temperature to measures or indicate the actual temperature of the thermo-couples T, $T^1$. The scale $s$ may be rotatably adjusted to any suitable position about the pivotal axis of the coil 82. The scale $s^1$ may be termed a deviation scale, showing how much the temperatures of the thermo-couples T and $T^1$ deviate from a given normal or desired temperature corresponding with the zero or mid-marking O of the scale $s^1$, and deflections to either side thereof indicating in any suitable units, as temperature, the amount of deviation, without, however, measuring or indicating the actual temperatures of the couples T, $T^1$.

The adjustable resistance 81 is for calibration or compensating purposes, as for resistance of leads 79, 80 or other variables which may have to be taken into account.

Besides giving quite accurate or precise indications of temperatures of the couples T, $T^1$, signals or indicating devices showing in general the state of temperature in the furnace or other environment in which the couples T, $T^1$ are employed may also be availed of. For this purpose incandescent lamps $g$, $b$, $w$ and $r$ may be employed, these being respectively colored, if desired, green, blue, white and red. One terminal of each of the lamps $g$ connects with a conductor 84, which with conductor 85 connects with any suitable source of current, and the same may be the same source, if desirable, to which the conductors 76 and 77 connect. The conductor 85 connects with the contact 86 bearing upon the commutator C, which has a contact 87 which extends over part of the periphery of the commutator. This contact is adapted to bridge the contacts 86 and 88, the latter connected to one terminal of the green lamp $g$. In the position indicated the circuit of the lamp $g$ is open because both contacts 86 and 88 are bearing upon insulation. The fact that the lamp $g$ is not glowing indicates that thermo-couple T is at the time in circuit and $T^1$ is out of circuit. When the contact 87 bridges contacts 86 and 88, lamp $g$ glows, indicating that thermo-couple $T^1$ is in circuit and that couple T is out of circuit, the contacts 68 and 71 being bridged by the middle commutator contact when contact 87 bridges contacts 86 and 88.

The conductor 85 communicates also with the two stationary bridges or contacts 89 and 90 coöperating with the contacts 43, 44 and 45, which are rotated by the shaft 10. The contact 43 connects through conductor 91 with the lamp $r$; contact 44 communicates through conductor 92 with the lamp $w$; and contact 45 communicates through conductor 93 with the lamp $b$.

The operation is as follows:

With the thermo-couple T in circuit, it produces an electro-motive-force which is impressed upon the galvanometer G in opposition to the potential impressed upon that galvanometer by the potentiometer current. When these potentials are equal the galvanometer G does not deflect and the needle 19 is in the mid-position indicated in Fig. 1. If now the temperature of the thermo-couple T increases, its electro-motive-force will increase and cause deflection of the galvanometer needle 19 toward the right, for example, whereby, due to the periodic vertical movement of the member 15 by cam 12, the needle 19 is clamped between the inclined edge 18 and the lower edge 22 of the right hand member 23, causing the arm 25 to be tilted in a clockwise direction about its pivot 24, thereby pushing on the right hand pin 28 on plate 27, and so tilting the movable or driving clutch member or arm 6 in a clockwise direction, while cam 11 is holding shoes 7, 7 from the rim 8 of clutch wheel or disk 9, the angular movement of the member 6 being dependent upon the degree of deflection of needle 19. The shoes 7 again engage the disk 8 upon release of the arm 5 by cam 11 and the left hand cam 30 engages the left hand lug 29, rotating the driving clutch member 6 in counterclockwise direction carrying the disk 8 in counterclockwise direction through an equal angle. This rotates the resistance R with respect to the contact 32 in such direction as to tend to restore a balance of electro-motive-forces which tends to decrease the deflection of the needle 19 which eventually, due to successive operations, may again find itself in mid or zero position indicated in Fig. 1, and no further actuation of the shaft 10 will occur.

If when this balance is again attained the temperature to which the thermo-couple T is subjected is above the normal or desired temperature, the contact 43 will be in engagement with contact 89 and so close circuit through the red lamp r which accordingly gives a signal or indication to the effect that the temperature is too high. If the temperature is not far above the normal or desired temperature the contact 43 may be in contact with brush 89 while contact 44 is still in engagement with brush 90, in which case lamps r and w will simultaneously glow, indicating that the temperature is too high, but only slightly so. Similarly, if the temperature to which the couple T is subjected and at which the needle 19 comes to a balance is below the desired or normal temperature, contact 45 will be in engagement with brush 90 and so cause energization of blue lamp b indicating too low a temperature; and if this temperature is not far too low, while contact 45 is in engagement with contact 90, contact 44 will still be in engagement with contact 89 and so cause white light w to glow.

At the same time that the contacts 43, 44 and 45 are rotated, as above described, upon change of temperature of the couple T, the Wheatstone bridge arms 36 and 37 are rotated to like extent and in like direction.

Assuming the temperature of the couple T to be above normal or desired temperature, with resultant position of the disk 35 corresponding with a position counterclockwise to that indicated in Fig. 4, resistance 36 will be less than resistance 37, the Wheatstone bridge will be unbalanced, and there will be a corresponding difference of potential of predetermined direction impressed upon conductors 79 and 80, causing the calibrated meter V to deflect toward the right, for example. The needle 83 in so deflecting to the right will, as regards scale $s^1$, indicate in degrees of temperature, or other suitable units, the extent of departure of temperature of the couple T from the desired or normal temperature, indicated by 0 on scale $s^1$.

Supposing the desired or normal temperature for the couple T is 1200 degrees; the scale s is rotated to such position that when there is no current through the galvanometer coil 82 the needle 83 points at 1200 degrees, as indicated on the drawing. In other words, the 1200 degree marking of the scale s is brought opposite the zero marking 0 of the scale $s^1$; when, as assumed, the needle 83 deflects toward the right, it will simultaneously indicate as to scale s the actual temperature of the thermo-couple T, while the scale $s^1$ merely indicates the extent of departure from the normal or desired temperature. It may sometimes not be desirable or necessary to have both scales s and $s^1$ in the instrument, but my invention comprehends employment of either or both.

Similarly, if the temperature of couple T is below normal or desired temperature, the needle 83 will deflect toward the left, and so again indicate departure from normal as well as actual temperature of the couple T, the deflection toward the left being due to reversal of polarities at the junctions between the resistances 74, 75 and conductors 79, 80.

What has been stated concerning thermo-couple T, is also true of thermo-couple $T^1$, the two couples being alternately brought into operative relation with the potentiometer circuit, including resistance R and galvanometer G, by the commutator C which rotates to any suitable or desired speed. The less the difference between the temperatures to which the couples T and $T^1$ are respectively subjected, the higher may be the frequency or speed of rotation of the commutator C, for in such case the mechanism controlled by the galvanometer needle 19 need not go through so many or so great steps.

Besides giving the indications by the lamps and measurements or indications by the meter V, the apparatus controlled by the galvanometer needle 19 moves the recorder marker 49 transversely to the direction of motion of the recorder paper P, which is indicated by the arrow. The marker 49 so makes a mark or record 94, which is a composite of effects of both couples T and T¹.

While only two temperature responsive devices T and T¹ have been shown, it will be understood that my invention comprehends also employment of only one and more than two with apparatus associated therewith in the manner herein described or equivalent manner.

What I claim is:

1. The combination with a deflecting member, of a source of power, a member adapted to produce a change in the deflection of said deflecting member and actuated by said source of power under control of said deflecting member, a plurality of members adapted severally to coöperate with said second named member in control of said deflecting member, means actuated by said source of power for bringing said members successively into coöperation with said second named member, a meter, a resistance determining the deflection of said meter, and means for varying said resistance controlled by said deflecting member.

2. The combination with a deflecting member, of a source of power, a member adapted to produce a change in the deflection of said deflecting member and actuated by said source of power under control of said deflecting member, a plurality of members adapted severally to coöperate with said second named member in control of said deflecting member, a meter, a resistance determining the deflection of said meter, and means actuated by said source of power under control of said deflecting member for varying said resistance.

3. The combination with a deflecting member, of a source of power, a member adapted to produce a change in the deflection of said deflecting member and actuated by said source of power under control of said deflecting member, a plurality of members adapted severally to coöperate with said second named member in control of said deflecting member, means bringing said members successively into coöperation with said second named member, a meter, and means controlling said meter actuated in unison with said second named member.

4. The combination with a deflecting member, of a source of power, a member adapted to produce a change in the deflection of said deflecting member and actuated by said source of power under control of said deflecting member, a plurality of members adapted severally to coöperate with said second named member in control of said deflecting member, a meter for making indications respecting said last named members, and means determining the readings of said meter actuated by said source of power under control of said deflecting member.

5. The combination with a galvanometer having a deflecting member, of a source of power, electrical means controlling said galvanometer comprising a device and a plurality of members adapted severally to coöperate with said device, said device actuated by said source of power under control of said deflecting member, means for bringing said members successively into coöperation with said device, an instrument for making measurements respecting said last named members, a circuit including said instrument, and means actuated by said source of power under control of said deflecting member for varying said circuit.

6. The combination with a galvanometer having a deflecting member, of a source of power, electrical means controlling said galvanometer comprising a device and a plurality of members adapted severally to coöperate with said device, said device actuated by said source of power under control of said deflecting member, means for bringing said members successively into coöperation with said device, an instrument for making measurements respecting said last named members, a Wheatstone bridge controlling said instrument, and means actuated by said source of power under control of said deflecting member controlling resistance of said Wheatstone bridge.

7. The combination with a galvanometer having a deflecting member, of a source of power, electrical means controlling said galvanometer comprising a device and a plurality of members adapted severally to coöperate with said device, said device actuated by said source of power under control of said deflecting member, means for bringing said members successively into coöperation with said device, an instrument for making measurements respecting said last named members, a Wheatstone bridge controlling said instrument, and means actuated by said source of power under control of said deflecting member moving resistance of said bridge to effect control of said instrument.

8. The combination with a galvanometer having a deflecting member, of a source of power, electrical means controlling said galvanometer comprising a device and a plurality of members adapted severally to coöperate with said device, said device actuated by said source of power under control of said deflecting member, means for bringing said members successively into coöperation with said device, an instrument for making measurements respecting said last named members, a Wheatstone bridge controlling said instrument, a resistance of said bridge moved by said source of power under control of said deflecting member, and a stationary contact engaging said resistance, relative movement of said contact and said resistance effecting control of said instrument.

9. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, an instrument for making indications respecting the temperatures of said temperature responsive devices, a circuit including said instrument, and means actuated by said source of power under control of said deflecting member for varying said circuit.

10. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, a second galvanometer whose deflections indicate the temperatures of said temperature responsive devices, a circuit including said second galvanometer, and means actuated by said source of power under control of said deflecting member varying said circuit to vary the deflections of said second galvanometer.

11. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, an instrument for making indications respecting the temperatures of said temperature responsive devices, and a variable resistance controlling said instrument and controlled by said deflecting member.

12. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, an instrument for making indications respecting the temperatures of said temperature responsive devices, a Wheatstone bridge controlling deflections of said instrument, variation of resistance of said bridge controlled by said deflecting member.

13. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, an instrument for making indications respecting the temperatures of said temperature responsive devices, a Wheatstone bridge controlling deflections of said instrument, resistance of said bridge moved by said source of power under control of said deflecting member.

14. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, a deviation meter indicating the departure of temperatures of said temperature responsive devices from a predetermined value, a Wheatstone bridge controlling said meter, and means actuated by said source of power under control of said deflecting member changing the relation of the resistance values of arms of said bridge.

15. The combination with a galvanometer having a deflecting member, of a source of power, a potentiometer controlling said galvanometer, a plurality of thermo-couples, a resistance of said potentiometer adjusted by said source of power under control of said reflecting member, means for bringing said thermo-couples successively into coöperation with said potentiometer, an instrument for giving indications respecting the temperatures of said thermo-couples, a circuit including said instrument, and means controlled by said deflecting member controlling said circuit.

16. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, a meter whose deflections are measures of the temperatures of said thermo-couples, a circuit including said meter, and means controlling said circuit controlled by said deflecting member.

17. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, a meter whose deflections are measures of the temperatures of said thermo-couples, a circuit including said meter, and means controlling said circuit actuated by said source of power under control of said deflecting member.

18. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, an instrument for giving indications respecting the temperatures of said thermocouples, a Wheatstone bridge controlling said instrument, and means controlled by said deflecting member controlling said Wheatstone bridge.

19. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, an instrument for giving indications respecting the temperatures of said thermocouples, a Wheatstone bridge controlling said instrument, and means actuated by said source of power under control of said deflecting member for varying the relation of the resistances in arms of said bridge.

20. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, an instrument for giving indications respecting the temperatures of said thermo-couples, a resistance controlling said instrument and moved to vary the same by said source of power under control of said deflecting member.

21. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, an instrument for giving indications respecting the temperatures of said thermo-couples, a Wheatstone bridge controlling said instrument, resistance of said bridge moved by said source of power under control of said deflecting instrument, and a stationary contact engaging said movable resistance to vary the relations of the resistances in arms of said bridge.

22. The combination with a deflecting member, of a source of power, a device and a member coöperatively controlling deflection of said deflecting member, means actuated by said source of power under control of said deflecting member varying the effect of said device, an instrument for indicating a condition of said member, and means controlling said instrument actuated by said source of power.

23. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, an instrument for giving indications respecting the temperatures of said thermo-couples, a Wheatstone bridge controlling said instrument, resistance of said bridge moved by said source of power under control of said deflecting instrument, and a stationary contact engaging said movable resistance to vary the relations of the resistances in arms of said bridge under control of said deflecting member.

24. The combination with a deflecting member, of a source of power, electrical devices coöperating in control of said deflecting member, one of said devices actuated by said source of power under control of said deflecting member, an instrument making indication respecting another of said devices, and means controlling said instrument actuated by said source of power under control of said deflecting member.

25. The combination with a deflecting member, of a source of power, electrical devices coöperating in control of said deflecting member, one of said devices actuated by said source of power under control of said deflecting member, an instrument making indication respecting another of said devices, a circuit controlling said instrument, and means controlling said circuit actuated by said source of power under control of said deflecting member.

26. The combination with a deflecting member, of a source of power, electrical devices coöperating in control of said deflecting member, one of said devices actuated by said source of power under control of said deflecting member, an instrument whose deflection is a measure of a condition of another of said devices, and variable electrical means controlling extent of deflection of said instrument and controlled by said source of power under control of said deflecting member.

27. The combination with a galvanometer having a deflecting member, of a source of power, electrical devices coöperating in control of said galvanometer, one of said devices varied by said source of power under control of said deflecting member, an instrument making indication respecting another of said devices, and means controlling said instrument controlled by said deflecting member.

28. The combination with a galvanometer having a deflecting member, of a source of power, electrical devices coöperating in control of said galvanometer, one of said devices varied by said source of power under control of said deflecting member, a second galvanometer making indication respecting another of said devices, a Wheatstone bridge controlling said second galvanometer, and means actuated by said source of power under control of said deflecting member varying resistance in an arm of said bridge.

29. The combination with a galvanometer having a deflecting member, of a source of power, electrical devices coöperating in control of said galvanometer, one of said devices varied by said source of power under control of said deflecting member, a second galvanometer making indication respecting another of said devices, a Wheatstone bridge controlling said second galvanometer, and resistance of said bridge moved by said source of power under control of said deflecting member to vary the electro-motive-force impressed upon said second galvanometer.

30. The combination with a galvanometer having a deflecting member, of a source of power, variable electrical means and a temperature responsive device coöperating in control of said galvanometer, said means being varied by said source of power under control of said deflecting member, an instrument making indication respecting the temperature of said temperature responsive device, and electrical means controlling said instrument varied by said source of power under control of said deflecting member.

31. The combination with a galvanometer having a deflecting member, of a source of power, variable electrical means and a temperature responsive device coöperating in control of said galvanometer, said means being varied by said source of power under control of said deflecting member, an instrument whose deflection indicates deviation of temperature of said temperature responsive device from a predetermined temperature, variable resistance determining deflection of said instrument, and means controlled by said deflecting member for varying said variable resistance.

32. The combination with a galvanometer having a deflecting member, of a source of power, variable electrical means and a temperature responsive device coöperating in control of said galvanometer, said means being varied by said source of power under control of said deflecting member, an instrument whose deflection indicates deviation of temperature of said temperature responsive device from a predetermined temperature, variable resistance determining deflection of said instrument, and means actuated by said source of power under control of said deflecting member for varying said variable resistance.

33. The combination with a galvanometer having a deflecting member, of a source of power, variable electrical means and a temperature responsive device coöperating in control of said galvanometer, said means being varied by said source of power under control of said deflecting member, a meter whose deflections measure the temperature of said temperature responsive device, a resistance whose variation determines extent of deflection of said meter, and means actuated by said source of power under control of said deflecting member for varying said resistance.

34. The combination with a galvanometer having a deflecting member, of a source of power, variable electrical means and a temperature responsive device coöperating in control of said galvanometer, said means being varied by said source of power under control of said deflecting member, an instrument making indication respecting temperature of said temperature responsive device, a Wheatstone bridge controlling said instrument, two resistance arms of said bridge moved by said source of power under control of said deflecting member, and a stationary contact with respect to which said resistance arms are moved to vary the electro-motive-force impressed upon said instrument.

35. The combination with a galvanometer having a deflecting member, of a source of power, a potentiometer and a thermo-couple controlling said galvanometer, a resistance of said potentiometer varied by said source of power under control of said deflecting member, a second galvanometer whose deflection makes indication respecting temperature of said thermo-couple, a resistance varied in accordance with changes of temperature of said couple controlling said instrument, and means actuated by said source of power under control of said deflecting member for varying said resistance.

36. The combination with a galvanometer having a deflecting member, of a source of power, a potentiometer and a thermo-couple controlling said galvanometer, a resistance of said potentiometer varied by said source of power under control of said deflecting member, a second galvanometer the extent of whose deflection is a measure of the temperature of said couple, a Wheatstone bridge with which said galvanometer is associated, and means actuated by said source of power under control of said deflecting member for varying resistance relations in said bridge to vary the electro-motive-force impressed upon said second galvanometer.

37. The combination with a galvanometer having a member capable of deflection in opposite directions, of a source of power, variable electrical means and an electrical device coöperating therewith to control said galvanometer, a clutch comprising a driving member driven by said source of power and controlled by said deflecting member, a driven member for varying said variable electrical means, an instrument capable of deflection in opposite directions and indicating thereby variation of a condition of said electrical device from a predetermined value, a circuit controlling said instrument, and means controlling said circuit actuated by said driven clutch member.

38. The combination with a galvanometer, of a source of power, variable electrical means and a plurality of electrical devices adapted severally to coöperate with said means to control said galvanometer, said means varied by said source of power under control of said galvanometer, means for bringing said devices successively into coöperation with said first named means, and means for indicating which of said devices is coöperating with said first named means.

39. The combination with a galvanometer, of a source of power, variable electrical means and a plurality of electrical devices adapted severally to coöperate with said means to control said galvanometer, said means varied by said source of power under control of said galvanometer, means actuated by said source of power for bringing said devices successively into coöperation with said first named means, and means for indicating which of said devices is coöperating with said first named means.

40. The combination with a galvanometer having a deflecting member, of a circuit and a device therewith controlling said galvanometer, a source of power, an instrument for making indication respecting a condition of said device, a circuit controlling said instrument, and means controlling said circuit actuated by said source of power under control of said deflecting member, said circuits being electrically independent of each other and coöperating only through actuation of said last named means by said source of power.

41. The combination with a galvanometer having a deflecting member, of a source of power, a temperature responsive device controlling said galvanometer, an instrument giving indications respecting the temperature to which said temperature responsive device is subjected, a circuit for said instrument, a controller for said circuit actuated by said source of power under control of said deflecting member, said circuits being electrically independent of each other and coöperating only through actuation of said controller by said source of power.

42. The combination with a deflecting member, of a source of power, a member adapted to produce a change in the deflection of said deflecting member and actuated by said source of power under control of said deflecting member, a plurality of members adapted severally to coöperate with said second named member in control of said deflecting member, and means actuated by said source of power for bringing said members successively into coöperation with said second named member.

43. The combination with a deflecting member, of a source of power, a member adapted to produce a change in the deflection of said deflecting member and actuated by said source of power under control of said deflecting member, a plurality of members adapted severally to coöperate with said second named member in control of said deflecting member, a meter, a resistance determining the deflection of said meter, means actuated by said source of power under control of said deflecting member for varying said resistance, and a recorder marker actuated by said source of power under control of said deflecting member.

44. The combination with a galvanometer having a deflecting member, of a source of power, electrical means controlling said galvanometer comprising a device and a plurality of members adapted severally to coöperate with said device, said device actuated by said source of power under control of said deflecting member, means for bringing said members successively into coöperation with said device, an instrument for making measurements respecting said last named members, a Wheatstone bridge controlling said instrument, means actuated by said source of power under control of said deflecting member controlling resistance of said Wheatstone bridge, and a marker actuated by said source of power under control of said deflecting member for producing a record respecting said plurality of members.

45. The combination with a galvanometer having a deflecting member, of a source of power, electrical means controlling said galvanometer comprising a variable member and a plurality of temperature responsive devices adapted severally to coöperate with said variable member to control said galvanometer, said variable member actuated by said source of power under control of said deflecting member, means for bringing said temperature responsive devices successively into coöperation with said variable member, an instrument for making indications respecting the temperatures of said temperature responsive devices, a circuit including said instrument, means actuated by said source of power under control of said deflecting member for varying said circuit, and a marker actuated by said source of power under control of said deflecting member for producing a record respecting temperatures of said temperature responsive devices.

46. The combination with a galvanometer having a deflecting member, of a source of power, a potentiometer controlling said galvanometer, a plurality of thermo-couples, a resistance of said potentiometer adjusted by said source of power under control of said deflecting member, means for bringing said thermo-couples successively into coöperation with said potentiometer, an instrument for giving indications respecting the temperatures of said thermo-couples, a circuit including said instrument, means controlled by said deflecting member controlling said circuit, and a marker actuated by said source of power under control of said deflecting member for producing a record respecting temperatures of said thermo-couples.

47. The combination with a deflecting member, of a source of power, a device and a member coöperatively controlling deflection of said deflecting member, means actuated by said source of power under control of said deflecting member varying the effect of said device, an instrument for indicating a condition of said member, means controlling said instrument actuated by said source of power, and a marker actuated by said source of power under control of said deflecting member for producing a record respecting said second named member.

48. The combination with a galvanometer having a deflecting member, of a source of power, variable electrical means and a temperature responsive device coöperating in control of said galvanometer, said means being varied by said source of power under control of said deflecting member, an instrument making indication respecting the temperature of said temperature responsive device, electrical means controlling said instrument varied by said source of power under control of said deflecting member, and a marker actuated by said source of power under control of said deflecting member for producing a record respecting temperature of said temperature responsive device.

49. The combination with a galvanometer, of a source of power, variable electrical means and a plurality of electrical devices adapted severally to coöperate with said means to control said galvanometer, said means varied by said source of power under control of said galvanometer, means for bringing said devices successively into coöperation with said first named means, means for indicating which of said devices is coöperating with said first named means, and a marker actuated by said source of power under control of said galvanometer to produce a record respecting said plurality of electrical devices.

50. The combination with a galvanometer having a deflecting member, of a circuit and a device therewith controlling said galvanometer, a source of power, an instrument for making indication respecting a condition of said device, a circuit controlling said instrument, means controlling said circuit actuated by said source of power under control of said deflecting member, said circuits being electrically independent of each other and coöperative only through actuation of said last named means by said source of power, and a marker actuated by said source of power under control of said deflecting member for making a record respecting changes of condition of said device.

51. The combination with a plurality of temperature responsive devices, of a galvanometer and coöperating means for giving indications respecting temperatures of said devices, switching means for bringing said temperature responsive devices successively into coöperative relation with respect to said galvanometer, and means for indicating which of said temperature responsive devices is at any given time in coöperative relation with said galvanometer.

52. The combination with a plurality of temperature responsive devices, of a galvanometer and coöperating means for giving indications respecting temperatures of said devices, switching means for bringing said temperature responsive devices successively into coöperative relation with respect to said galvanometer, and a group of lamps indicating, respectively, different conditions respecting said temperature responsive devices.

53. The combination with a galvanometer having a deflecting member, of a circuit and a device therewith controlling said galvanometer, a source of power, an instrument for making indication respecting a condition of said device, a circuit controlling said instrument, means controlling said circuit actuated by said source of power under control of said deflecting member, said circuits being electrically independent of each other and coöperating only through actuation of said last named means by said source of power, a group of indicator lamps each indicating a different condition respecting said device, and switching mechanism actuated by said source of power under control of said deflecting member controlling said lamps.

54. The combination with a deflecting member, of a source of power, a member adapted to produce a change in the deflection of said deflecting member and actuated by said source of power under control of said deflecting member, a plurality of devices adapted severally to coöperate with said second named member in controlling said deflecting member, means actuated by said source of power for bringing said devices successively into coöperation with said second named member, an indicator coöperating with said means for indicating which of said devices is coöperating with said second named member, a meter for making indications respecting said devices, a resistance determining the deflection of said meter, means for varying said resistance actuated by said source of power under control of said deflecting member, and a second indicator for indicating the condition of said devices actuated by said source of power under control of said deflecting member.

55. The combination with a device responsive to changes in a condition, of a structure movable under control of said device, means for indicating changes in condition affecting said device, and means operated by said movable structure controlling said indicating means.

56. The combination with a movable structure, of a device responsive to changes in a condition, a galvanometer controlled by said device and controlling movement of said structure, means responsive to movement of said structure, and an indicator controlled by said last named means.

57. The combination with a device responsive to changes in a condition, of a movable structure, a galvanometer controlled by said device and controlling said movable structure, a second galvanometer, an electrical circuit for said second galvanometer, and a resistance in said circuit varied by movement of said structure.

58. The combination with a device responsive to changes in a condition, of a movable structure, a Wheatstone bridge associated with said structure, movement of said structure varying the resistance relations of said Wheatstone bridge, and a deflecting galvanometer associated with said Wheatstone bridge for measuring by the extent of its deflection the extent of change in said condition.

59. The combination with a temperature responsive device, of a movable structure controlled thereby, a Wheatstone bridge having two arms movable with said structure, a fixed contact associated with said two arms, and a galvanometer associated with said Wheatstone bridge.

60. The combination with a thermo-couple and an electrical circuit therefor, of a structure movable in response to potential changes in said circuit, a second electrical circuit, a resistance in said second circuit varied by movement of said structure, and an indicator in said second circuit, said circuits being electrically independent.

61. The combination with a thermo-couple and an electrical circuit therefor, of a structure movable under control of said circuit, a Wheatstone bridge having two arms carried by said movable structure whereby the resistance relations of said Wheatstone bridge are varied by movement of said structure, and a galvanometer in circuit with said Wheatstone bridge.

62. The combination with a thermo-couple, of an electrical circuit for said thermo-couple, a structure movable under control of said thermo-couple, a second electrical circuit including an instrument for indicating the temperature condition of said thermo-couple, and means operated by said structure controlling said indicator.

63. The combination with a temperature responsive device, of a galvanometer for indicating the temperature of said device, a group of signal lamps for indicating the temperature of said device, and means responsive to changes in temperature of said device controlling said lamps individually.

64. The combination with a plurality of temperature responsive devices, of means for indicating the temperatures thereof, a group of signal lamps for indicating the temperatures of said devices, and switching mechanism for periodically bringing said devices into coöperative relation with said indicating means and said group of lamps.

65. The combination with a plurality of temperature responsive devices, of means for indicating the temperatures thereof, a group of signal lamps for indicating the temperatures of said devices, switching mechanism for periodically bringing said devices into coöperative relation with said indicating means, and means responsive to changes in temperature of said devices controlling said lamps individually.

66. The combination with a device responsive to changes in a condition, of a movable structure, a Wheatstone bridge having two of its arms movable with said structure, and an instrument controlled by said Wheatstone bridge for giving indications respecting said condition.

67. The combination with a device responsive to changes in a condition, of a movable structure, means controlled by said device controlling the extent of movement of said structure, a Wheatstone bridge having two arms movable with said structure, and an indicating instrument controlled by said Wheatstone bridge for indirectly giving indications respecting said condition.

In testimony whereof I have hereunto affixed my signature this 19th day of February, 1919.

HENRY BREWER.